(12) United States Patent
Nangia et al.

(10) Patent No.: US 8,270,359 B2
(45) Date of Patent: Sep. 18, 2012

(54) ANTENNA PORT INFORMATION SIGNALING IN WIRELESS COMMUNICATION SYSTEM

(75) Inventors: Vijay Nangia, Algonquin, IL (US); Robert T. Love, Barrington, IL (US)

(73) Assignee: Motorola Mobility LLC, Libertyville, IL (US)

( * ) Notice: Subject to any disclaimer, the term of this patent is extended or adjusted under 35 U.S.C. 154(b) by 404 days.

(21) Appl. No.: 12/724,188

(22) Filed: Mar. 15, 2010

(65) Prior Publication Data
US 2011/0222485 A1    Sep. 15, 2011

(51) Int. Cl.
*H04W 72/02* (2009.01)
*H04W 72/12* (2009.01)
(52) U.S. Cl. ........................................ 370/329; 455/509
(58) Field of Classification Search .................. 370/311, 370/329, 330, 343; 455/450, 509; 375/260
See application file for complete search history.

(56) References Cited

U.S. PATENT DOCUMENTS

| 2010/0303034 | A1* | 12/2010 | Chen et al. | 370/329 |
| 2011/0019776 | A1* | 1/2011 | Zhang et al. | 375/340 |
| 2011/0085503 | A1* | 4/2011 | Nam et al. | 370/329 |
| 2011/0158351 | A1* | 6/2011 | Gorokhov et al. | 375/316 |

OTHER PUBLICATIONS

3GPP TSG RAN WG1 #56bis; Seoul, Korea; Mar. 23-27, 2009; Control Signaling for Enhanced DL Transmission for LTE; Motorola; R1-091339; 10 pages.
3GPP TSG RAN WG1 #55; Prague, Czech Republic, Nov. 10-14, 2009; Enhanced Beamforming Technique for LTE-A; CATT; R1-084286; 3 pages.
3GPP TSG RAN WG1 #55bis; Ljubljana, Slovenia; Jan. 12-16, 2009; Further Discussion for Enhanced Beamforming Technique; CATT, Potevio; R1-090186; 8 pages.

* cited by examiner

*Primary Examiner* — Chi Pham
*Assistant Examiner* — Ahmed Elallam
(74) *Attorney, Agent, or Firm* — Roland K. Bowler, II

(57) ABSTRACT

A method in a wireless communication User Equipment (UE) includes receiving a Physical Downlink Control Channel (PDCCH) message assigning a data transmission on a Physical Downlink Shared CHannel (PDSCH), wherein the PDCCH message includes scheduling information with a first New Data Indicator (NDI) bit field for a first transport block and a second New Data Indicator (NDI) bit field for a second transport block. The UE determines one or more antenna ports for the data transmission based on the NDI bit fields of the transport blocks, before receiving the assigned data transmission on the PDSCH.

20 Claims, 2 Drawing Sheets

200

210

UE receives a PDCCH message assigning a data transmission, wherein the assignment message indicates which of the first and second transport blocks are enabled or disabled

220

UE determines antenna port or ports for the data transmission for the enabled transport block or blocks

230

UE receiving the assigned data transmission on the PDSCH based on the determined antenna port or ports

100

101

Base Unit

103

Remote Unit

102

Base Unit

104

Remote Unit

UE receives a PDCCH message assigning a data transmission, wherein the assignment message indicates which of the first and second transport blocks are enabled or disabled

220

UE determines antenna port or ports for the data transmission for the enabled transport block or blocks

230

UE receiving the assigned data transmission on the PDSCH based on the determined antenna port or ports

ANTENNA PORT INFORMATION SIGNALING IN WIRELESS COMMUNICATION SYSTEM

FIELD OF THE DISCLOSURE

The present disclosure relates generally to wireless communications and, more particularly, to signaling antenna port information for dual layer beamforming, and corresponding methods.

BACKGROUND

The Long Term Evolution (LTE), Release 8 (Rel-8) of the Third Generation Partnership Project (3GPP) Universal Mobile Telecommunications System (UMTS) supports only single-layer beamforming on a single antenna port in the downlink. LTE release 9 (Rel-9) supports dual-layer beamforming using UE specific reference signals (RS) or dedicated reference signals (DRS) for both LTE-TDD and FDD in the downlink. With the introduction of dual-layer beamforming in LTE Rel-9, single-layer downlink transmission requires an indication of the antenna port to the UE within a DCI format supporting dual-layer or dual-antenna port transmission. The enhanced features and capabilities proposed for LTE Rel-9 should be backwards compatible with networks and user equipment (UE) compliant with LTE Rel-8 and should aim to be an extension of the beamforming in Rel-8. It has been agreed in 3GPP TSG (Technical Specification Group) RAN (Radio Access Network) Meeting #43 to at least introduce single user multi-input multi-output (SU-MIMO) in the defined frame work with the possible addition of enhancements for multi user multi-input multi-output (MU-MIMO) with beamforming in TSG RAN#44.

The various aspects, features and advantages of the invention will become more fully apparent to those having ordinary skill in the art upon careful consideration of the following Detailed Description thereof with the accompanying drawings described below. The drawings may have been simplified for clarity and are not necessarily drawn to scale.

BRIEF DESCRIPTION OF THE DRAWINGS

FIG. 2 is a process flow diagram.

DETAILED DESCRIPTION

Figure 1:
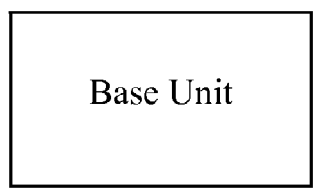
FIG. 1 illustrates a wireless communication system.
Figure 1:
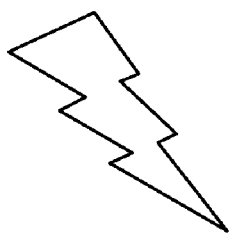
Figure 1:
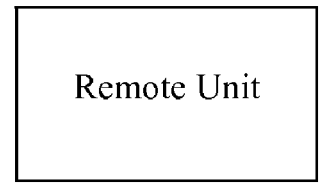
Figure 1:
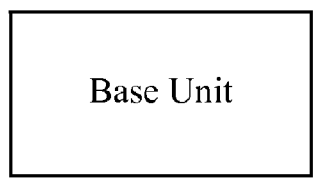
Figure 1:
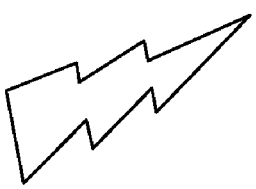
Figure 1:
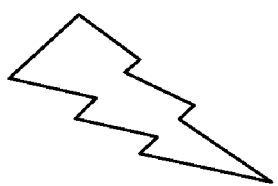
Figure 1:
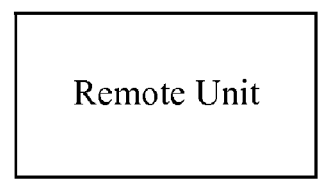

In FIG. 1, a wireless communication system 100 comprises one or more fixed base infrastructure units 101, 102 forming a network distributed over a geographical region for serving remote units in the time and/or frequency and/or spatial domain. A base unit may also be referred to as an access point, access terminal, base, base station, Node-B (NB), eNode-B (eNB), Home Node-B (HNB), Home eNode-B (HeNB), Macro eNode-B (MeNB), Donor eNode-B (DeNB), relay node (RN), femtocell, femto-node, network node or by other terminology used in the art. The one or more base units each comprise one or more transmitters for downlink transmissions and one or more receivers for uplink transmissions. The base units are generally part of a radio access network that includes one or more controllers communicably coupled to one or more corresponding base units. The access network is generally communicably coupled to one or more core networks, which may be coupled to other networks like the Internet and public switched telephone networks among others. These and other elements of access and core networks are not illustrated but are known generally by those having ordinary skill in the art.

In FIG. 1, the one or more base units serve a number of remote units 103, 104 within a corresponding serving area, for example, a cell or a cell sector, via a wireless communication link. The remote units may generally be fixed or mobile. The remote units may also be referred to as subscriber units, mobiles, mobile stations, mobile units, users, terminals, subscriber stations, user equipment (UE), user terminals, wireless communication devices, relay nodes, or by other terminology used in the art. The remote units also comprise one or more transmitters and one or more receivers. In FIG. 1, the base unit 101 transmits downlink communication signals to serve remote unit 103 in the time and/or frequency and/or spatial domain. The remote unit 104 communicates with base unit 102 via uplink communication signals. Sometimes the base unit is referred to as a serving or connected or anchor cell for the remote unit. The remote units may also communicate with the base unit via a relay node. Generally, the remote unit communicates with a serving base unit (serving cell), and one or more neighboring base units (neighbor cells). In FIG. 1, the base unit 101 is a serving cell for remote unit 103 and the base unit 102 is a neighbor cell for remote unit 103. The base unit 102 may also be a serving cell for remote unit 104. Similarly, the base unit 101 may be a neighbor cell for remote unit 104.

The wireless communication network also includes a location server or an equivalent entity to determine the location of the remote unit as is known generally. Alternatively, one of the base stations may act as the location server. Each base unit generally broadcasts a positioning reference signal (PRS) to be received by the remote units. The positioning reference transmission may be a set of one or more positioning reference symbols (PRS) of various values arranged in a pattern unique to the base station sending the positioning reference transmission.

In one implementation, the wireless communication system is compliant with the 3GPP Universal Mobile Telecommunications System (UMTS) LTE protocol, also referred to as EUTRA or 3GPP LTE or some later generation thereof, wherein the base unit transmits using an orthogonal frequency division multiplexing (OFDM) modulation scheme on the downlink and the user terminals transmit on the uplink using a single carrier frequency division multiple access (SC-FDMA) scheme. The instant disclosure is particularly relevant to 3GPP LTE Release 8 (Rel-8) and later Releases, but may also be applicable to other wireless communication systems. More generally the wireless communication system may implement some other open or proprietary communication protocol, for example, IEEE 802.16(d) or 802.16(e) (WiMAX), among other existing and future protocols. The disclosure is not intended to be implemented in any particular wireless communication system architecture or protocol. The architecture may also include the use of spreading techniques such as multi-carrier CDMA (MC-CDMA), multi-carrier direct sequence CDMA (MC-DS-CDMA), Orthogonal Frequency and Code Division Multiplexing (OFCDM) with one or two dimensional spreading. The architecture in which the features of the instant disclosure are implemented may also be based on simpler time and/or frequency division multiplexing/multiple access techniques, or a combination of these various techniques. In alternate embodiments, the wireless communication system may utilize other communication system protocols including, but not limited to, TDMA or direct sequence CDMA. The communication system may be a TDD (Time Division Duplex) or FDD (Frequency Division Duplex) system.

In communication systems that evolved from supporting single-layer beamforming transmissions to supporting multi-layer beamforming transmissions in the downlink there is a need to provide antenna port control information to the UE. 3GPP LTE is one such communication system as described more particularly herein, although the present disclosure is not limited to implementation in LTE systems. More particularly there is a need for a mechanism for signaling information from which the UE may determine the appropriate antenna port or ports for an assigned data transmission, wherein the assigned data transmission is either a single-antenna port transmission or a multi-antenna port transmission.

In one embodiment, in the process 200 of FIG. 2, at 210, a UE receives a message assigning a data transmission on a shared channel. In one embodiment, the assigned data transmission is a single-antenna port transmission. In another embodiment, the assigned data transmission is a multi-antenna port transmission. In one embodiment, the message comprises scheduling information for a first transport block and a second transport block. The scheduling information further comprises a first New Data Indicator (NDI) bit field for the first transport block and a second NDI bit field for the second transport block.

In the exemplary 3GPP LTE system, the message assigning the data transmission is a Physical Downlink Control Channel (PDCCH) message and the assigned data transmission is on a Physical Downlink Shared CHannel (PDSCH). In other embodiments, the message could be some other control channel message and the assigned date transmission could be on some other shared channel. In 3GPP LTE implementations, the PDCCH message comprises the scheduling information including the NDI bit field for the first transport block and the NDI bit field for the second transport block.

In 3GPP LTE Rel-9 systems, new DCI formats are likely to be introduced to support dual-layer DRS-based beamforming. However, in some embodiments, it is desirable to maintain the same number of blind decodes (44) as in Rel-8 to support the additional PDCCH candidates within the Rel-9 time frame. Thus in some implementations, new transmission modes should be defined in which a UE is semi-statically configured via higher layer signaling to receive PDSCH data transmissions to support dual-layer DRS-based beamforming scheme. In this mode, the UE monitors 2 DCI formats—DCI format 1A and a new DCI format to support dual-layer DRS-based beamforming. Thus in one embodiment, the UE receives a configuration message via higher layer signaling configuring the UE in a transmission mode to receive the data transmission on the PDSCH on the first antenna port and/or the second antenna port. The configuration message may be used to configure the UE to decode the PDCCH message with a scrambled cyclic redundancy check (CRC). The CRC may be scrambled by a Cell Radio Network Temporary Identifier (C-RNTI) or a Semi-Persistent Scheduling (SPS) C-RNTI.

To support dual-layer beamforming, UE-specific RS or DRS signal transmission on a new antenna port—e.g., port 6 (DRS pattern 1). The new antenna port 6 is defined in addition to the existing Rel-8 UE-specific RS signals on antenna port 5 ((DRS pattern 0). The existing Rel-8 UE-specific RS signals on antenna port 5 and the newly defined UE-specific RS signals on antenna port 6 can be multiplexed via CDM, FDM and/or TDM. Additionally, the UE-specific RS signals may be power boosted relative to the PDSCH data RE (e.g., in case of MU operation). The ratio of PDSCH EPRE to UE-specific RS EPRE for each OFDM symbol in RB assigned to UE can be configured by higher-layer signaling. Thus, in one embodiment, the UE receives a dedicated reference signal on the first antenna port and/or the second antenna port for demodulating the assigned data transmission on the PDSCH. The dedicated reference signal on the first antenna port is specific to the first antenna port and the dedicated reference signal on the second antenna port is specific to the second antenna port.

Since, non-codebook precoding is used with UE-specific RS, the required control signaling is similar to Rel-8 DCI format 2 (independent MCS, NDI, RV for the two transport blocks) with differences in the precoding information field.

In case of control signaling for SU-MIMO DRS-based beamforming only, the DCI format is based on DCI format 2 with no precoding information bits. Beamforming (single-antenna port transmission) of PDSCH codeword 0 (on layer 0) and associated UE-specific RS (DRS pattern 0) corresponds to transmission on antenna port 5. Likewise, beamforming of PDSCH codeword 1 (on layer 1) and associated UE-specific RS (DRS pattern 1) corresponds to transmission on antenna port 6. Thus, in one embodiment, the UE receives the dual-antenna port transmission on a first layer 0 corresponding to a first codeword 0 comprising channel encoded bits of the first transport block and on a second layer 1 corresponding to a second codeword 1 comprising channel encoded bits of the second transport block.

In case one of the transport blocks is disabled, the other transport block is mapped to codeword 0 as in current LTE Rel-8 DCI Format 2 and transmitted along with UE-specific reference signals (DS pattern 0) on antenna port 5. Thus, in one embodiment, the UE receives the single-antenna port transmission on a first layer 0 corresponding to a first codeword 0 comprising channel encoded bits of the enabled transport block. UE assumes no UE-specific RS transmission (DRS pattern 1) on antenna port 6 with the REs corresponding to DRS pattern 1 on the allocated RBs used for PDSCH transmission of codeword 0 in case of FDM or TDM multiplexing of DRS 0 and DRS 1. In case of CDM multiplexing of the UE-specific RS signals, the UE assumes no CDM multiplexing of the DRS, i.e., orthogonal code/sequence for UE-specific RS transmission on the antenna port 6 is not used.

The PDCCH information field sizes are given in Table 1 for PDCCH DCI Format 2B.

TABLE 1

| PDCCH DCI Format 2B | |
|---|---|
| PDCCH Field | bits |
| RA header | 1/0 (for 1.4 MHz) |
| RB assignment | $\lceil N_{RB}^{DL}/P \rceil$ |
| TPC | 2 |
| DAI | 2 (TDD only) |
| HARQ Process ID | 3 (FDD), 4 (TDD) |
| TB to code word swap flag | 1 |
| MCS transport block 1 | 5 |
| NDI transport block 1 | 1 |
| RV transport block 1 | 2 |
| MCS transport block 2 | 5 |
| NDI transport block 2 | 1 |
| RV transport block 2 | 2 |
| CRC | 16 |

A new transmission mode, mode 8, is defined to support single-user dual-layer DRS-based beamforming transmission scheme. In this transmission mode 8, the UE monitors 2 DCI formats—DCI format 1A and DCI format 2B to support dual-layer DRS-based beamforming without any increase in the number of blind decodes as shown in Table 2.

TABLE 2

PDCCH and PDSCH for Mode 8 supporting SU-MIMO beamforming

| Transmission mode | DCI format | Search Space | Transmission scheme of PDSCH corresponding to PDCCH |
|---|---|---|---|
| Mode 8- PDCCH and PDSCH configured by C-RNTI | DCI format 1A<br>DCI format 2B | Common and UE specific<br>UE specific | Transmit diversity<br>Dual-antenna port; port 5 and 6 |
| Mode 8- PDCCH and PDSCH configured by SPS C-RNTI | DCI format 1A<br>DCI format 2B | Common and UE specific<br>UE specific | Single-antenna port; port 5<br>Dual-antenna port; port 5 and 6 |

As shown in Table 2, if a UE is configured by higher layers to decode PDCCH with CRC scrambled by the SPS C-RNTI, the PDSCH transmission scheme corresponding to PDCCH DCI format 1A is single-antenna port; port 5. As in Rel-8, when a UE configured in transmission mode 8 receives a DCI Format 1A assignment, the UE assumes that the PDSCH transmission is associated with transport block 1 and that transport block 2 is disabled.

To support MU-MIMO with beamforming without increase in UE complexity due to additional PDCCH blind decodes, a new transmission mode, e.g. mode 9, can be defined to support MU-MIMO beamforming transmission scheme. A UE in mode 9 monitors two mode, 2 DCI formats—DCI format 1A and a new DCI format 1E to support MU-MIMO DRS-based beamforming.

The DCI format 1E for MU-MIMO beamforming is similar to DCI format 1D currently supported in Rel-8 for MU-MIMO without the need for the downlink power offset information and precoding information due to the use of UE-specific RS. However, the eNB needs to signal to the UE the antenna port on which the PDSCH and UE-specific RS is transmitted. This Antenna port indicator field mapping is shown in Table 3. Table 3

TABLE 3

Antenna Port Indicator field for MU-MIMO beamforming (1 bit)

| Bit field mapped to index | Antenna Port |
|---|---|
| 0 | antenna port 5 |
| 1 | antenna port 6 |

Also, it is beneficial to indicate (improved channel estimation in case of CDM DRS multiplexing, reduced RS overhead with FDM/TDM DRS multiplexing, improved detection, etc.) whether UE-specific RS is transmitted to another MU UE on the other antenna port, i.e., indicating by a Single-user/Multi-user Flag bit as shown in Table 4 whether another MU UE is paired on at least some of the RBs allocated.

TABLE 4

Single-user/Multi-user Beamforming Flag bit

| Bit field mapped to index | Indicator |
|---|---|
| 0 | Single-user |
| 1 | Multi-user |

By indicating single-user beamforming and thus no MU operation on the PDSCH transmission, the UE assumes no UE-specific RS transmission on the other antenna port with the REs corresponding to the other DRS pattern on the allocated RBs also used for PDSCH transmission in case of FDM or TDM multiplexing of DRS 0 and DRS 1. In case of CDM multiplexing of the UE-specific RS signals, the UE assumes no CDM multiplexing of the DRS, i.e., orthogonal code/sequence for UE-specific RS transmission on the other antenna port is not used. The Single-user/Multi-user Flag and the Antenna Port Indicator field can be jointly coded.

The PDCCH information field sizes are given in Table 5 for PDCCH DCI Format 1E. The Antenna Port Information is indicated in the PDCCH DCI in Table 5 on a separate Antenna Port Information Bit Field.

TABLE 5

PDCCH DCI Format 1E

| PDCCH Field | (bits) |
|---|---|
| Localized/Distributed RA flag | 1 |
| RB assignment | $\lceil \log_2 (N_{RB}^{DL}(N_{RB}^{DL} + 1)/2) \rceil$ |
| MCS | 5 |
| HARQ Process ID | 3 (FDD, 4(TDD) |
| NDI | 1 |
| RV | 2 |
| TPC | 2 |
| DAI | 2 (TDD only) |
| Antenna port information | 1 |
| Single-user/Multi-user flag | 1 |
| CRC | 16 |

In transmission mode 9 supporting MU-MIMO with beamforming transmission scheme, the UE monitors 2 DCI formats—DCI format 1A and DCI format 1E to support MU-MIMO DRS-based beamforming without any increase in the number of blind decodes as shown in Table 6.

TABLE 6

PDCCH and PDSCH for Mode 9 supporting MU-MIMO beamforming

| Transmission mode | DCI format | Search Space | Transmission scheme of PDSCH corresponding to PDCCH |
|---|---|---|---|
| Mode 9- PDCCH and PDSCH configured by C-RNTI | DCI format 1A<br>DCI format 1E | Common and UE specific<br>UE specific | Transmit diversity<br>Multi-user MIMO; antenna port 5 and 6 |
| Mode 9- | DCI format 1A' | Common and UE specific | single-antenna port; port 5 or 6 |

TABLE 6-continued

PDCCH and PDSCH for Mode 9 supporting MU-MIMO beamforming

| Transmission mode | DCI format | Search Space | Transmission scheme of PDSCH corresponding to PDCCH |
|---|---|---|---|
| PDCCH and PDSCH configured by SPS C-RNTI | DCI format 1E | UE specific | Multi-user MIMO; antenna port 5 and 6 |

In case a UE is configured by higher layers to decode PDCCH with CRC scrambled by the SPS C-RNTI, the PDSCH transmission scheme corresponding to PDCCH DCI format 1A' (same size as Rel-8 DCI format 1A, but modified by CRC mask and/or bit remapping) is single-antenna port. The antenna port (port 5 or 6) information for single antenna port MU-MIMO transmission can be indicated by CRC mask as in the case of DCI format 0 for UL antenna selection. Alternatively, the antenna port information can be semi-statically configured via higher layer signaling when the UE is configured in the transmission mode 9 or by re-mapping one of the bits in DCI format 1A to indicate the antenna port information (e.g., localized/distributed RA flag—assuming localized assignment only). One example of the PDCCH information field sizes for PDCCH DCI Format 1A (denoted 1A' and same size as 1A) are given in Table 9.

TABLE 7

PDCCH DCI Format 1A'

| PDCCH Field | (bits) |
|---|---|
| Format 0/1A flag | 1 |
| Localized/Distributed RA flag | 1 |
| RB assignment | $\lceil \log_2(N_{RB}^{DL}(N_{RB}^{DL} + 1)/2) \rceil$ |
| MCS | 5 |
| HARQ Process ID | 3 (FDD), 4 (TDD) |
| NDI | 1 |
| RV | 2 |
| TPC | 2 |
| DAI | 2 (TDD only) |
| CRC with CRC mask (antenna port 5 or 6) | 16 |

With the use of UE-specific RS, there is no need to signal precoding information and it is possible to support SU-MIMO and MU-MIMO beamforming in the same transmission mode (where the UE monitors DCI format similar to DCI 1A and 2B). Using DCI 2B enables frequency-selective MU-MIMO operation using type 0/1 resource allocation while DCI 1E supports localized/distributed resource allocation (type 2 RA). Frequency-selective MU-MIMO operation—UE pairing on a per-RB or RB group—may be beneficial especially in the case of TDD where more accurate channel information is available at the eNB due to exploitation of channel reciprocity and uplink sounding.

As discussed above, two additional 1-bit information fields—antenna port information and single-user/multi-user flag—are needed to be included in DCI format 2B to enable support of MU-MIMO (i.e., single transport block PDSCH transmission—transport block 1 enabled and transport block 2 disabled). When a transport block is disabled (i.e., if $I_{MCS}=0$ and if $rv_{idx}=1$), there are two unused/reserved bits in DCI format 2B (also in DCI format 2 and 2A): 91] transport block to codeword swap flag—1 bit; and (2) New data indicator of the disabled transport block—1 bit. These two unused bits can be used to signal the two additional 1-bit information fields—antenna port information and single-user/multi-user flag—for MU-MIMO beamforming without increasing the information size of DCI format 2B. One example of the PDCCH information field sizes for PDCCH DCI Format 2B supporting both SU and MU DRS-based beamforming are given in Table 8.

TABLE 8

PDCCH DCI Format 2B supporting SU-MIMO and MU-MIMO beamforming

| PDCCH Field | (bits) |
|---|---|
| RA header | 1/0 (for 1.4 MHz) |
| RB assignment | $\lceil N_{RB}^{DL}/P \rceil$ |
| TPC | 2 |
| DAI | 2 (TDD only) |
| HARQ Process ID | 3 (FDD), 4 (TDD) |
| TB to code word swap flag (both TB enabled) or antenna port information (one TB enabled) | 1 |
| MCS transport block 1 | 5 |
| NDI transport block 1 (TB1 enabled) or single-user/multi-user flag (TB1 disabled) | 1 |
| RV transport block 1 | 2 |
| MCS transport block 2 | 5 |
| NDI transport block 2 (TB2 enabled) or single-user/multi-user flag (TB2 disabled) | 1 |
| RV transport block 2 | 2 |
| CRC | 16 |

Additionally, it is desirable especially for cell-edge UEs to also support the smaller size of single transport block PDCCH format 1E for rank=1 MU-MIMO compared to dual transport block PDCCH format 2B. Comparing the size of PDCCH DCI format 1E in Table 5 with DCI format 1A, it can be seen that they are quite similar. It is possible to support both transmit diversity and single antenna port transmission in DCI format 1A (modified to DCI format 1A") by applying a CRC mask to the PDCCH CRC scrambled by the C-RNTI. The antenna port (port 5 or 6) information for single antenna port MU-MIMO transmission can be semi-statically configured via higher layer signaling when the UE is configured in the transmission mode. Alternatively, one of the bits in DCI format 1A can be re-mapped to indicate the antenna port information (e.g., localized/distributed RA flag—assuming localized assignment only, MSB bit of MCS field—MCS MSB bit assumed to be 0). Similarly, the single-user/multi-user flag can be indicated by re-mapping one of the bits in DCI format 1A when a UE is configured by higher layers to decode PDCCH with CRC scrambled by the C-RNTI. Alternatively, the UE can assume to be always in MU operation with another UE (multi-user flag set)-UE assumes UE-specific RS transmission on the other antenna port to be present and no PDSCH transmission on the REs corresponding to the other DRS pattern in case of FDM or TDM multiplexing of antenna port 5 and 6 DRS. Thus, in one embodiment, the UE demodulates the assigned single-antenna port transmission on the PDSCH based on the dedicated reference signal specific to the indicated antenna port and assuming the presence of a dedicated reference signal specific to an antenna port other than the indicated antenna port. If single-user single port transmission is desired, the UE can be re-configured to Rel-8 transmission mode 7. One possibility of the PDCCH information field sizes for PDCCH DCI Format 1A (denoted 1A" and same size as 1A) are given in Table 9.

TABLE 9

PDCCH DCI Format 1A"

| PDCCH Field | (bits) |
|---|---|
| Format 0/1A flag | 1 |
| Localized/Distributed RA flag | 1 |
| (Tx diversity) or Antenna port Information (single antenna port tx) | |
| RB assignment | $\lceil \log_2(N_{RB}^{DL}(N_{RB}^{DL} + 1)/2\rceil$ |
| MCS | 5 |
| HARQ Process ID | 3 (FDD), 4 (TDD) |
| NDI | 1 |
| RV | 2 |
| TPC | 2 |
| DAI | 2(TDD only) |
| CRC with CRC mask (Tx diversity or single antenna port) | 16 |

Thus, in this transmission mode 8 supporting both SU-MIMO and MU-MIMO beamforming with type 0, 1 and 2 resource allocation, the UE monitors 2 DCI formats—modified DCI format 1A (same size as Rel-8 DCI format 1A, but modified by CRC mask and/or bit remapping) and DCI format 2B without any increase in the number of blind decodes as shown in Table 10.

TABLE 10

PDCCH and PDSCH for Mode 8 supporting both SU-MIMO and MU-MIMO beamforming

| Transmission mode | DCI format | Search Space | Transmission scheme of PDSCH corresponding to PDCCH |
|---|---|---|---|
| Mode 8- PDCCH and PDSCH configured by C-RNTI | DCI format 1A" | Common and UE specific | Transmit diversity or single-antenna port, port 5 or 6 |
| | DCI format 2B | UE specific | single-user MIMO or Multi-user MIMO; Dual-antenna port; port 5 and 6 |
| Mode 8- PDCCH and PDSCH configured by SPS C-RNTI | DCI format 1A' | Common and UE specific | single-antenna port; port 5 or 6 |
| | DCI format 2B | UE specific | Single-user MIMO or Multi-user MIMO; Dual-antenna port; port 5 and 6 |

Thus, it is possible to introduce a single additional transmission mode (mode 8) to support both SU-MIMO and MU-MIMO beamforming with UE-specific RS and thus enable switching between the two transmission schemes. The signaling support for MU-MIMO beamforming enables forward compatibility in case MU-MIMO enhancements are not agreed for Rel-9.

In embodiments where a single-antenna port transmission is assigned, generally, the assignment message indicates that one of the first and second transport blocks is enabled and that the other of the first and second transport blocks is disabled. In FIG. 2 at 220, generally, the UE determines an antenna port for the assigned data transmission for the enabled transport block. In systems where a PDCCH message assigns a single-antenna port transmission, the PDCCH message indicates that one of the first and second transport blocks is enabled and that the other of the first and second transport blocks is disabled. According to this implementation, the UE determines an antenna port for the assigned single-antenna port transmission for the enabled transport block based on the NDI bit field of the disabled transport block. In FIG. 2 at 230, the UE receives the assigned data transmission. For a single-antenna port transmission on the PDSCH, the UE receives the assigned single-antenna port transmission on the PDSCH for the enabled transport block based on the determined antenna port.

In embodiments where a multi-antenna port transmission may be assigned, generally, the assignment message indicates indicate that the data transmission is either a single-antenna port transmission or a multi-antenna port transmission. In FIG. 2 at 220, generally, the UE determines an antenna port for the assigned data transmission for the enabled transport block or blocks. If the assigned data transmission on the PDSCH is for a single-antenna port transmission, one of the first or second transport blocks is enabled and the other of the first or second transport blocks is disabled, as described above. In this case, the UE determines an antenna port for the single-antenna port transmission on the PDSCH of the enabled transport block based on the NDI bit field of the disabled transport block, wherein the antenna port is determined from a set comprising a first antenna port and a second antenna port. If the assigned data transmission on the PDSCH is for a dual-antenna port transmission, both the first and second transport blocks are enabled, the UE selects the first antenna port for the PDSCH transmission of the first transport block and the UE selects the second antenna port for the PDSCH transmission of the second transport block. In FIG. 2 at 230, the UE receives the assigned data transmission. In systems that accommodate multi-antenna port transmissions on the PDSCH, the UE receives the assigned data transmission on the PDSCH for the enabled transport block or blocks based on the determined antenna port or ports.

The present disclosure describes control signaling necessary to support SU-MIMO and MU-MIMO dual-layer beamforming using UE specific RS. In the 3GPP LTE example, the principles of Rel-8 single-layer beamforming control signaling have been extended to define new DCI formats (2B, 1E) and transmission modes for efficient support without any increase in the number of blind decodes. In other embodiments, additional transmission modes can be introduced to support SU-MIMO beamforming and/or MU-MIMO beamforming. Alternatively, a single additional transmission mode can be introduced to support both SU-MIMO and MU-MIMO beamforming with UE-specific RS enabling dynamic switching between the two transmission schemes, frequency-selective MU-MIMO and associated scheduling benefits.

While the present disclosure and the best modes thereof have been described in a manner establishing possession and enabling those of ordinary skill to make and use the same, it will be understood and appreciated that there are equivalents to the exemplary embodiments disclosed herein and that modifications and variations may be made thereto without departing from the scope and spirit of the inventions, which are to be limited not by the exemplary embodiments but by the appended claims.

What is claimed is:

1. A method in a wireless communication User Equipment (UE), the method comprising:
    receiving, at the UE, a Physical Downlink Control Channel (PDCCH) message assigning a single-antenna port transmission on a Physical Downlink Shared CHannel (PDSCH),
    the PDCCH message comprising scheduling information for a first transport block and a second transport block, the scheduling information comprises a first New Data Indicator (NDI) bit field for the first transport block and a second New Data Indicator (NDI) bit field for the second transport block,
    the PDCCH message indicating that one of the first and second transport blocks is enabled and that the other of the first and second transport blocks is disabled;
    determining, at the UE, an antenna port for the assigned single-antenna port transmission on the PDSCH for the enabled transport block based on the NDI bit field of the disabled transport block;
    receiving, at the UE, the assigned single-antenna port transmission on the PDSCH.

2. The method of claim 1, further comprising receiving a configuration message via higher layer signaling configuring the UE to decode the PDCCH message with a scrambled cyclic redundancy check (CRC).

3. The method of claim 1, further comprising determining the antenna port from a set comprising a first antenna port and a second antenna port based on the NDI bit field of the disabled transport block.

4. The method of claim 3, further comprising receiving a configuration message via higher layer signaling configuring the UE in a transmission mode to receive the single-antenna port transmission on the PDSCH on the first antenna port or the second antenna port.

5. The method of claim 1, further comprising
    receiving a dedicated reference signal for demodulating the assigned single-antenna port transmission on the PDSCH,
    wherein the dedicated reference signal is specific to the determined antenna port.

6. The method of claim 5, further comprising demodulating the assigned single-antenna port transmission on the PDSCH based on the dedicated reference signal specific to the determined antenna port and assuming the presence of a dedicated reference signal specific to an antenna port other than the determined antenna port.

7. The method of claim 5,
    wherein resource elements (REs) of the dedicated reference signal have more power relative to data resource elements (REs) of the assigned single-antenna port transmission on the PDSCH.

8. The method of claim 1 further comprising receiving an energy ratio metric via higher layer signaling, the energy ratio metric is a ratio of PDSCH Energy-Per-RE (EPRE) to a dedicated reference signal EPRE for each OFDM symbol of the assigned single-antenna port transmission on the PDSCH.

9. The method of claim 1, further comprising receiving, at the UE, the assigned single-antenna port transmission on the PDSCH on a first layer 0 corresponding to a first codeword 0 comprising channel encoded bits of the enabled transport block.

10. The method of claim 1, wherein receiving the PDCCH message includes receiving a Downlink Control Information (DCI) Format 2B message.

11. The method of claim 1,
    the scheduling information further comprises a first Modulation and Coding Scheme (MCS) bit field and a first Redundancy Version (RV) bit field for the first transport block and a second MCS bit field and a second RV bit field for the second transport block,
    the method further comprising identifying the disabled transport block based on a combination of MCS bit field information and RV bit field information of the first and second transport blocks.

12. A method in a wireless communication User Equipment (UE), the method comprising:
    receiving, at the UE, a Physical Downlink Control Channel (PDCCH) message assigning a data transmission on a Physical Downlink Shared CHannel (PDSCH),
    the PDCCH message comprising scheduling information for a first transport block and a second transport block, the scheduling information comprises a first New Data Indicator (NDI) bit field for the first transport block and a second New Data Indicator (NDI) bit field for the second transport block,
        if the assigned data transmission on the PDSCH is for a single-antenna port transmission, one of the first or second transport blocks is enabled and the other of the first or second transport blocks is disabled, the UE determines an antenna port for the single-antenna port transmission on the PDSCH of the enabled transport block based on the NDI bit field of the disabled transport block, wherein the antenna port is determined from a set comprising a first antenna port and a second antenna port,
    if the assigned data transmission on the PDSCH is for a dual-antenna port transmission, both the first and second transport blocks are enabled, the UE selects the first antenna port for the PDSCH transmission of the first transport block and the UE selects the second antenna port for the PDSCH transmission of the second transport block,
    receiving, at the UE, the assigned data transmission on the PDSCH.

13. The method of claim 12, further comprising receiving a configuration message via higher layer signaling configuring the UE in a transmission mode to receive the data transmission on the PDSCH.

14. The method of claim 12, further comprising receiving a configuration message via higher layer signaling configuring the UE to decode the PDCCH with a scrambled cyclic redundancy check (CRC).

15. The method of claim 12, further comprising receiving a dedicated reference signal on each of the determined antenna ports for demodulating the assigned data transmission on the PDSCH,
    wherein the dedicated reference signal is specific to the determined antenna port.

16. The method of claim 15, wherein resource elements (REs) of the dedicated reference signal have more power relative to data resource elements (REs) of the assigned data transmission on the PDSCH.

17. The method of claim 15 further comprising receiving an energy ratio metric via higher layer signaling, the energy ratio metric is a ratio of PDSCH Energy-Per-RE (EPRE) to a dedicated reference signal EPRE for each OFDM symbol of the assigned data transmission on the PDSCH.

18. The method of claim 12, further comprising
if the assigned data transmission on the PDSCH is for the single-antenna port transmission, receiving the single-antenna port transmission on a first layer 0 corresponding to a first codeword 0 comprising channel encoded bits of the enabled transport block,
if the assigned data transmission on the PDSCH is for the dual-antenna port transmission, receiving the dual-antenna port transmission on a first layer 0 corresponding to a first codeword 0 comprising channel encoded bits of the first transport block and on a second layer 1 corresponding to a second codeword 1 comprising channel encoded bits of the second transport block.

19. The method of claim 12, wherein receiving the PDCCH message includes receiving a Downlink Control Information (DCI) Format 2B message.

20. The method of claim 12,
the scheduling information further comprises a first Modulation and Coding Scheme (MCS) bit field and a first Redundancy Version (RV) bit field for the first transport block and a second MCS bit field and a second RV bit field for the second transport block,
the method further comprising determining whether the first and/or the second transport block is enabled or disabled based on a combination of MCS bit field information and RV bit field information of the first and second transport blocks.

* * * * *